United States Patent [19]

Riley

[11] 4,423,604
[45] Jan. 3, 1984

[54] ADJUSTABLE SPACER FOR CONTACT PLATE FREEZER

[75] Inventor: Eugene Riley, Macon, Mo.

[73] Assignee: Banquet Foods Corporation, Macon, Mo.

[21] Appl. No.: 418,007

[22] Filed: Sep. 14, 1982

[51] Int. Cl.³ ............................................... F17C 5/14
[52] U.S. Cl. .................................... 62/341; 100/93 P; 100/194
[58] Field of Search ................ 62/341; 100/93 P, 194, 100/195

[56] References Cited

U.S. PATENT DOCUMENTS

| 2,283,923 | 5/1942 | Hall | 62/341 |
| 2,455,867 | 12/1948 | Kleist | 62/341 |
| 2,927,443 | 3/1960 | Knowles | 62/341 |
| 3,020,731 | 2/1962 | Knowles | 62/341 |
| 4,180,987 | 1/1980 | McLaughlin | 62/341 |

OTHER PUBLICATIONS

"Ameriomatic Contact Plate Freezers".

Primary Examiner—Ronald C. Capossela
Attorney, Agent, or Firm—Willian, Brinks, Olds, Hofer, Gilson & Lione, Ltd.

[57] ABSTRACT

An improvement is disclosed for contact plate freezers. Adjustable spacer means are provided which can change the distance separating consecutive freezing plates within the freezer. This enables a single contact plate freezer to be used on products of various sizes.

10 Claims, 10 Drawing Figures

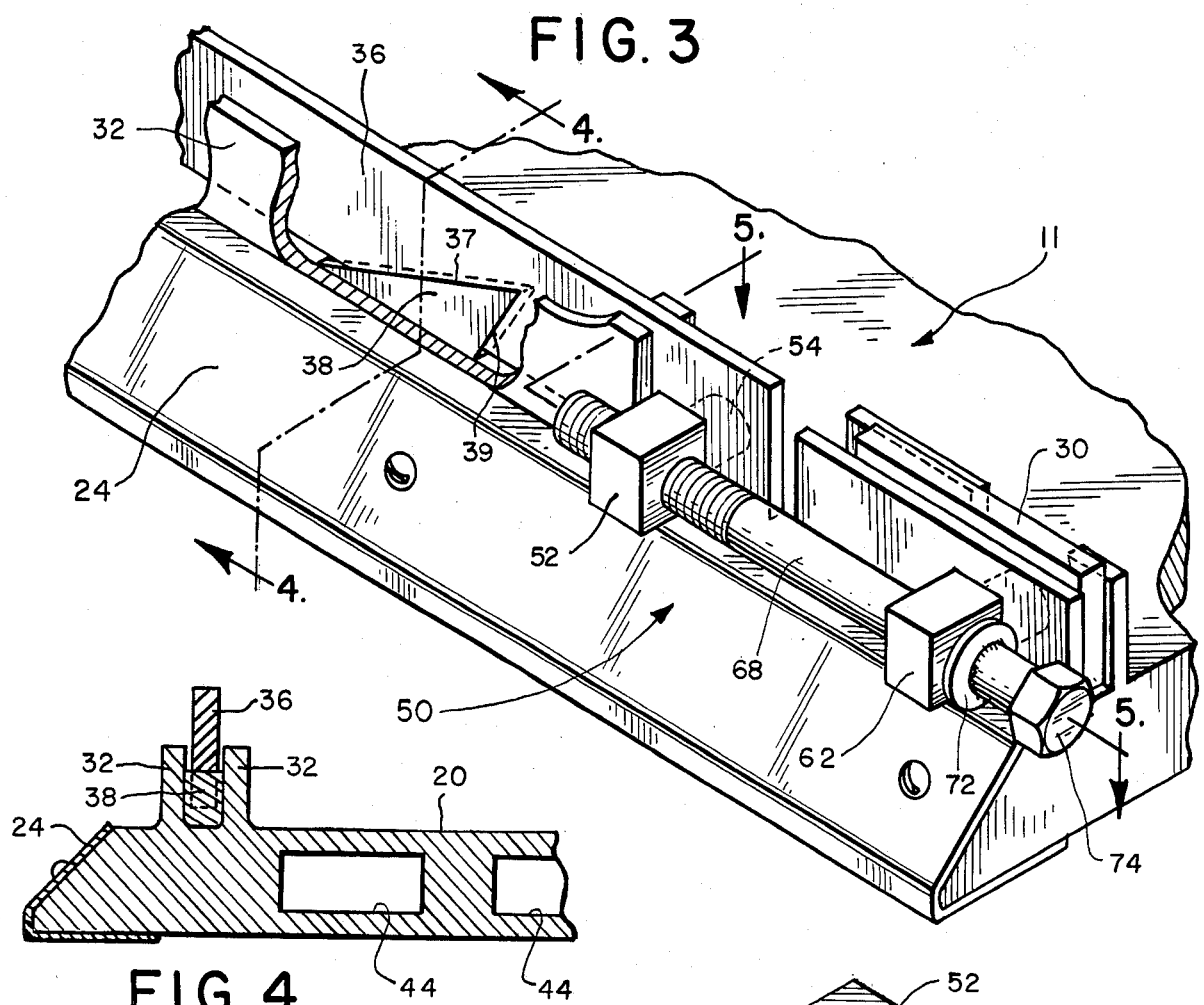
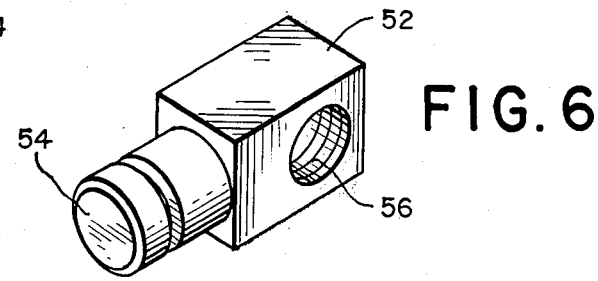
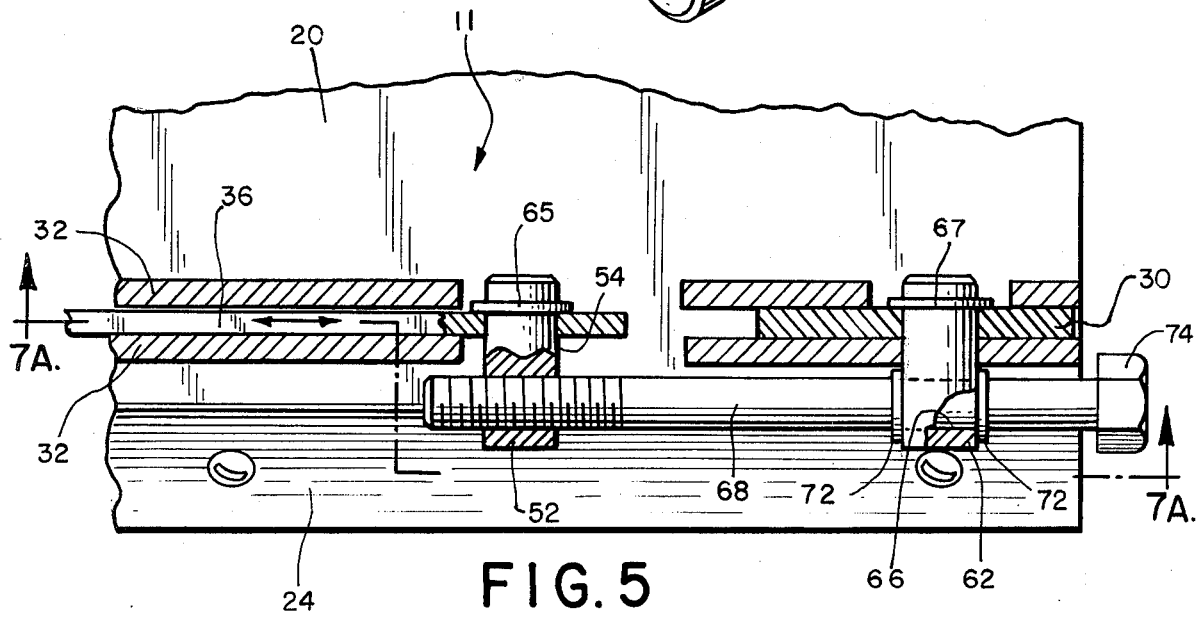

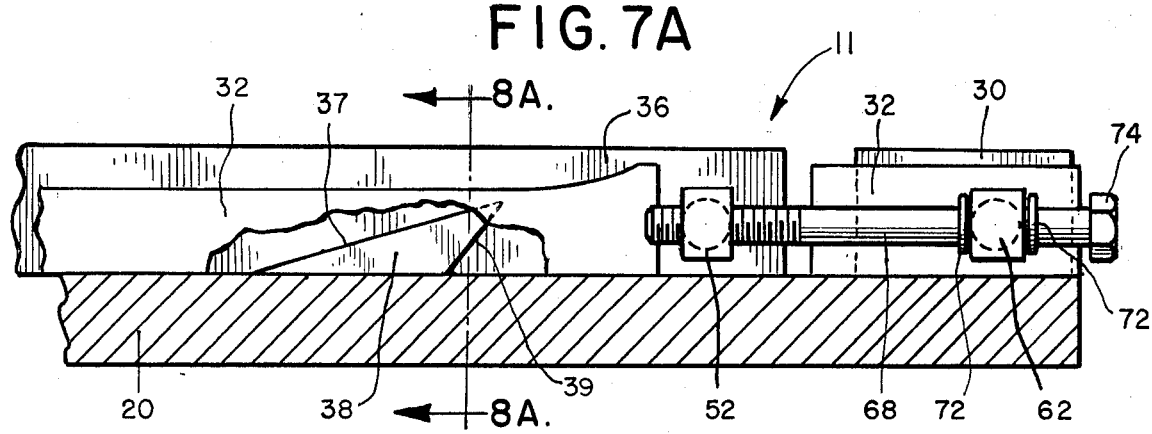
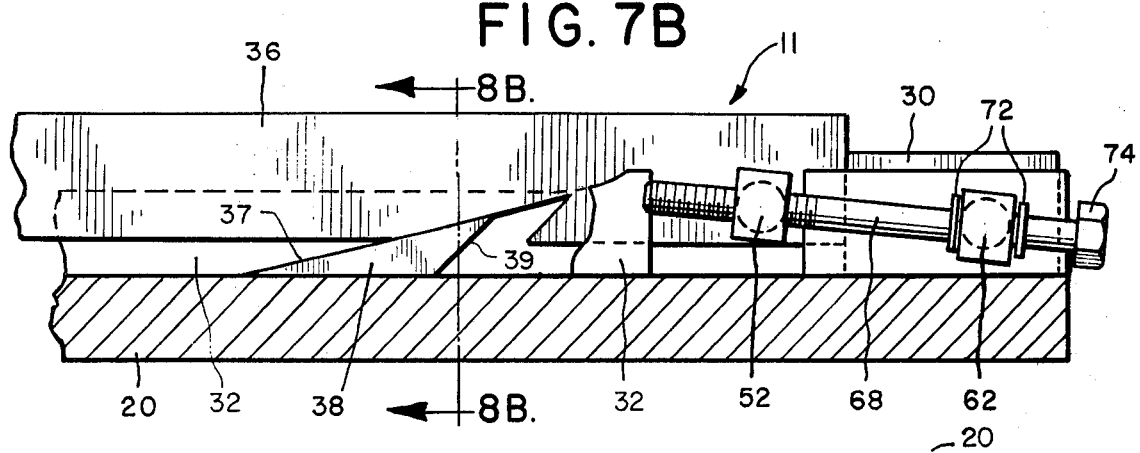
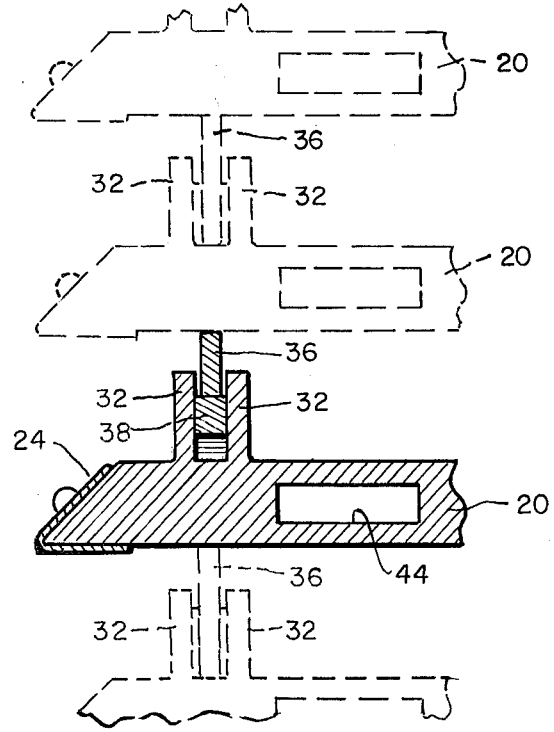
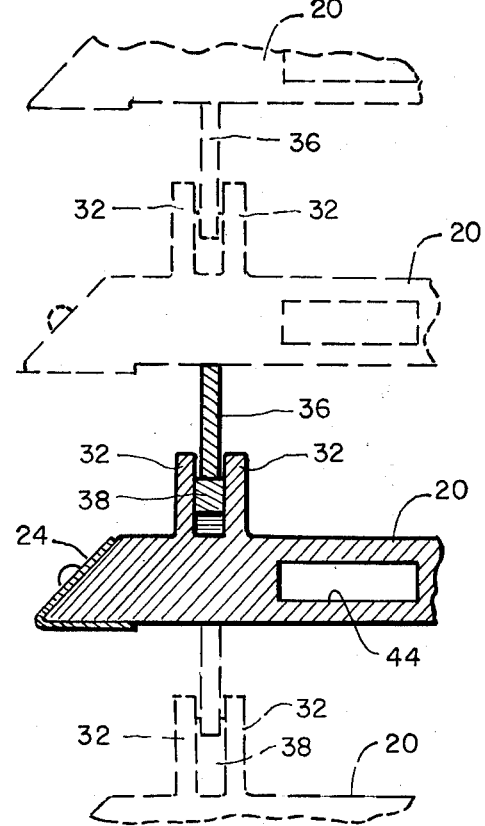

ADJUSTABLE SPACER FOR CONTACT PLATE FREEZER

BACKGROUND OF THE INVENTION

This invention relates to contact plate freezers used by the frozen food industry. Products are frozen in these freezers while making contact with freezing plates above and below the product. This achieves a rapid freezing which maintains the quality of the products.

The freezing plates used in conventional contact plate freezers are separated from each other by a certain distance to accommodate the product it will freeze. This separation distance is constant between all of the freezing plates in the freezer and cannot be changed. Thus, these contact freezers may be used for only one size of product. If a manufacturer produces products of different sizes it must purchase a separate freezer for each size product it produces. These contact plate freezers are huge capital expenses. Thus, the need for additional freezers can seriously hamper a manufacturer's ability to diversify his product line.

It is therefore a primary object of the present invention to provide an improved contact plate freezer for use by the frozen food industry. Other objects include providing an improved contact plate freezer which achieves greater utility and economy than those of the prior art.

SUMMARY OF THE INVENTION

The objects of the invention are achieved in an improved contact plate freezer having adjustable spacer means mounted on the freezing plates. These adjustable spacers allow the distance between consecutive freezing plates to be changed and thus enables a single contact plate freezer to handle more than one product size.

The adjustable spacer means is mounted on a freezing plate for use in a contact plate freezer. Trackways are positioned along opposite edges of the freezing plate. Wedges, acting as ramps are located within the trackways. A spacer bar with wedge-shaped notches along its bottom edge fits over the wedges in the trackways. Means are provided for pulling the spacer bars within the trackways so that as they are pulled they rise up on the wedges into a new position. Each freezing plate in a stack rests upon the spacer bars of the underlying freezing plate. By adjusting the spacer bars in their trackways, the distance between freezing plates can be changed. Therefore, different sized products may be accommodated by the same contact plate freezer.

Other objects and advantages of the invention will become apparent during the following description of the presently preferred embodiment of the invention taken in conjunction with the drawings.

BRIEF DESCRIPTION OF THE DRAWINGS

FIG. 3 is a perspective view of the adjustable spacer means of the present invention;

FIG. 4 is an end view of the adjustable spacer means of the present invention taken along line 4—4 of FIG. 3;

FIG. 5 is a top view of the adjustable spacer means of the present invention taken along line 5—5 of FIG. 3;

FIG. 6 is a perspective view of the block with tapped hole of the adjustable spacer means of the present invention;

FIG. 7A is a side view of the adjustable spacer means of the present invention in its bottom position;

FIG. 7B is a side view of the adjustable spacer means of the present invention in its top position;

FIG. 8A is an end view of a stack of freezing plates having their adjustable spacer means in their bottom positions; and FIG. 8B is an end view of a stack of freezing plates having their adjustable spacer means in their top positions.

DETAILED DESCRIPTION OF THE PREFERRED EMBODIMENT

Figure 1:
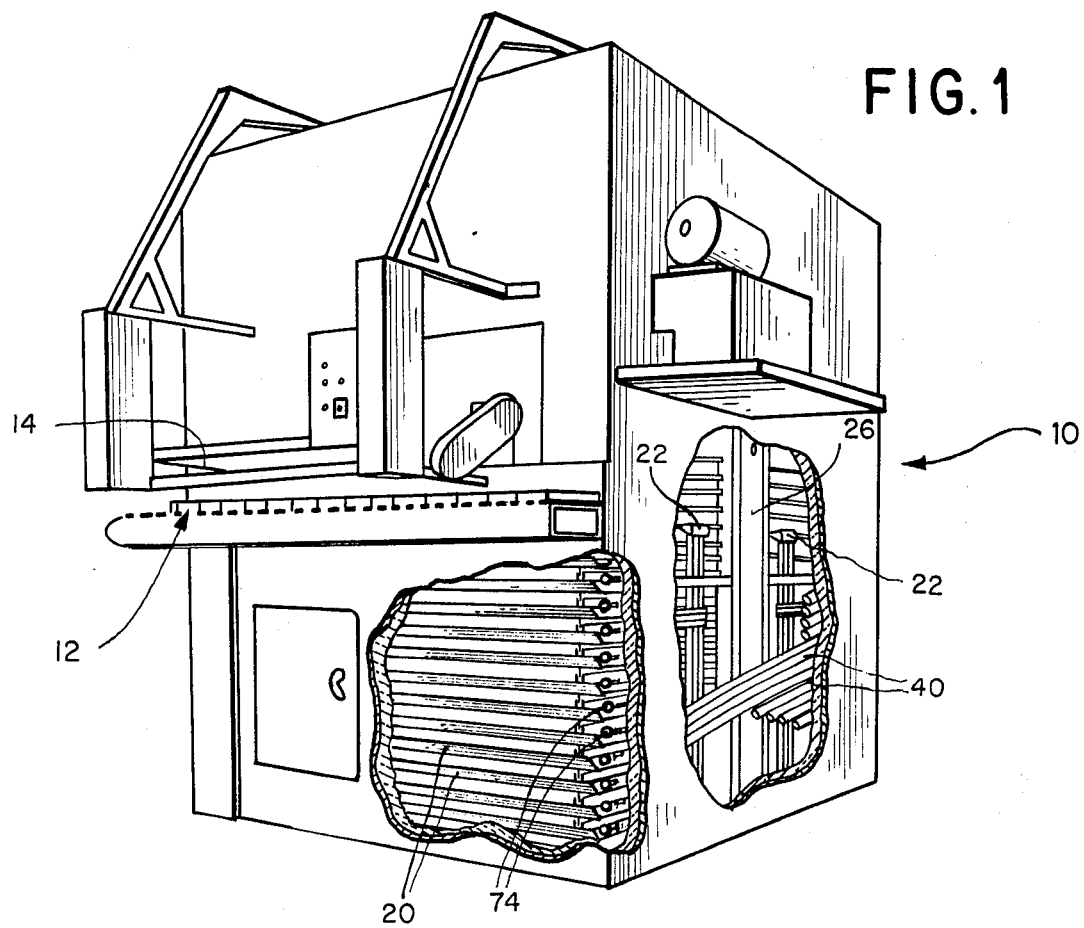
FIG. 1 is a perspective view of a preferred embodiment of the contact plate freezer of the invention with a portion cut away for a sectional view.

Referring now to FIG. 1, a contact plate freezer 10 employing the present invention is shown. Inside the freezer 10 is a stack of freezing plates 20. The freezing plates 20 are preferably made of aluminum, however, steel or some other suitable metal may be substituted. Spring loaded catch arms 22 separate the stack into an upper and lower stack of freezing plates. The catch arms 22 are positioned on opposite sides of the freezing plates 20 to support the upper stack above the lower stack. The distance between the upper stack and lower stack is large enough so that products may be easily loaded onto the top of the lower stack. Products are brought into position for loading into the freezer 10 by a conveyor 12. When a full row of products is in front of the freezer, the conveyor 12 stops and a sweeper arm 14 pushes the products into the freezer 10 and onto the top of the lower stack of freezing plates 20.

Figure 2:
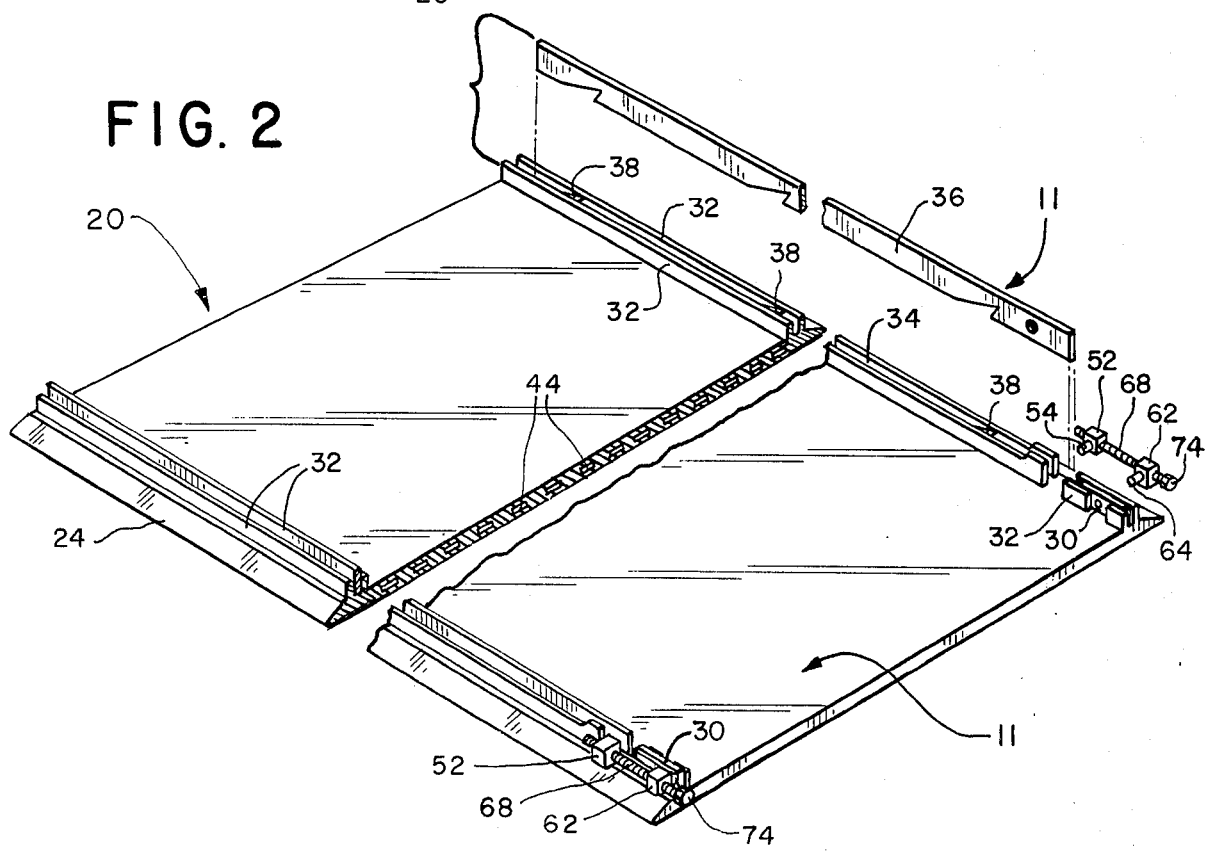
FIG. 2 is a perspective view of an improved freezing plate of the present invention with an exploded view of the spacer means along one of its edges.

After the freezing plate on top of the lower stack has been filled with products, hydraulic cylinders 26 lift the top freezing plate from the lower stack upwards onto the bottom of the upper stack. The catch arms 22 are pushed aside by chamfers 24 along the opposite edges of the freezing plate being lifted. A chamfer 24 on a freezing plate is shown in FIG. 2. When the freezing plate has been lifted past the spring loaded catch arms 22, the arms spring back into position to support the just enlarged upper stack of freezing plates. The hydraulic cylinders 26 also lift the lower stack into position, so that the top freezing plate receives the products as they are loaded by the sweeper arm 14.

The freezing of products is a continuous process. When the lower stack is void of freezing plates, the upper stack constitutes the entire stack of freezing plates 20. All of the freezing plates are now filled with products. To continue the product freezing process, the hydraulic cylinders 26 operate to lower the entire stack to the bottom of the freezer. The catch arms 22 are moved out of the way by a cam until the entire stack of plates is at the bottom of the freezer. The lower stack now includes the entire stack of freezing plates 20. The loading process can continue onto the top freezing plate of the lower stack of plates. As a row of products are slid onto the freezing plate by the sweeper arm 14, a corresponding row of frozen products are being pushed out off the rear of the freezing plate onto a conveyor which leads the frozen products away for any further processing and packaging. Thus, loading and unloading take place simultaneously.

Freezing of the products is quickened by contact made with the freezing plates 20. The freezing plates 20 are kept cold by the circulation of liquid ammonia. Typically, the plates are kept at about −40° F. for freezing foods and at about −45° F. for hardening ice cream. Flexible refrigerant hoses 40 carry the liquid ammonia to the freezing plates 20. There are hollow conduits 44, shown in FIGS. 2 and 4, between the top and bottom surfaces of the freezing plates to accommodate circulation of the liquid ammonia through the plates. The surfaces of the freezing plates are thus kept at the appropriate freezing temperature. The rapid contact freezing performed by these freezers helps to maintain the quality of the products. Consecutive freezing plates 20 are preferably separated from each other by a distance substantially equal to the height of the products being frozen. Best freezing results are obtained when contact is made with the top and bottom of the products.

Referring now to FIG. 2, an adjustable spacer 11 is shown on a single freezing plate 20. Along the opposite edges of the freezing plate, just above the chamfers 24, are mounted a pair of rails 32. Rails 32 run parallel along each edge of the freezing plate 20 to form a trackway 34 in which rides a spacer bar 36. The rails 32 in the preferred embodiment are 3/16 of an inch wide and $\frac{3}{4}$ of an inch high. At the front end of the freezing plate 20, the rails 32 increase to one inch in height. The rails 32 are discontinuous at the front end to allow space for the adjustment mechanism. For the preferred embodiment described here, the surface of the freezing plate 20 is 144" along the rails 32 and 92" wide between the rails 32 at opposite edges of the plate.

Inside the trackway 34 formed by the rails 32 are mounted wedges 38 which act as ramps. The preferred embodiment incorporates five wedges 38 in each trackway 34. These preferred wedges 38 have a top surface 37 inclined at 15 degrees from horizontal, as shown most clearly in FIGS. 7A and 7B. The top edges of the wedges 38 have a vertical height from the freezing plate of $\frac{5}{8}$ of an inch. The wedges 38 have an underside 39 extending from top edge of the wedge to the plate surface under the wedge's top surface. The underside 39 makes a 45° angle with the freezing plate surface.

There is a spacer bar 36 that rides in each trackway 34. Along the bottom edge of the spacer bars 36, there are wedge-shaped notches 42 superposed over the wedges 38. The top edge of the spacer bar is flat. In the stack of freezing plates, the freezing plates are supported by the spacer bars 36 of the underlying plates, as shown in FIGS. 8A and 8B. The separation distance between consecutive freezing plates is thus determined by the height of the spacer bars 36. In the preferred embodiment, the spacer bar is $1\frac{1}{8}$ inches high. Thus, $1\frac{1}{8}$ inches is the separation distance between the plates when the spacer bars 36 are in their bottom position, resting on the freezer plate on which they are mounted, as shown in FIGS. 7A and 8A.

To adjust the spacer bars 36 to a higher position, pulling means 50 including two blocks 52, 62 and a bolt 68 is provided for pulling the spacer bars 36 up the wedges 38. Each pulling means 50 is attached to a spacer bar 36 and a rail 32 at the front end of the freezing plate 20. There is an opening in the rail 32 to provide space for the pulling means 50 to connect with the spacer bar 36.

The pulling means 50 is more clearly shown in FIG. 3. In particular, the pulling means 50 is rotatably secured to the spacer bar 36 by the block 52 which has a dowel 54 which protrudes from the block 52 into a hole in the spacer bar 36. The dowel 54 is kept in the hole in the spacer bar 36 by a lock washer 65, shown in FIG. 5. As seen in FIG. 6, a hole 56 has been drilled and tapped through block 52. In the preferred embodiment, the dowel 54 extends $\frac{7}{8}$ of an inch from the block and has a $\frac{1}{2}$ inch diameter. The face of the block 52 attached to the dowel 54 is $\frac{3}{4}$ of an inch high and $\frac{1}{2}$ of an inch wide. The block 52 is 1 inch long from its outer face to the face attached to the dowel 54. The tapped hole 56 in the block 52 is $\frac{1}{2}$ inch in diameter and is drilled and tapped through the $\frac{3}{4}$ inch by 1 inch face of the block. The center of the hole 56 is $\frac{3}{8}$ of an inch from the outer face of the block 52.

The pulling means 50 is attached to the rail 32 by another block 62 which has a dowel 64 which extends into the rail 32. This block 62 is shorter than the block 52 since it must butt up against the rail 32 and still have its hole 66 aligned with hole 56 in block 52. Therefore, in the preferred embodiment, block 62 is 13/16 of an inch long. The hole 66 is 17/32 inches in diameter, allowing room for the bolt 68 to freely rotate. In its other dimensions, block 62 is the same as block 52. The dowel 64 is secured to the rail 32 by a lock washer 67. The lock washers 65, 67 keep the blocks 54, 64 from falling away from their respective connections yet allow the dowels to rotate within their connection holes.

The two blocks 52, 62 are connected to each other by bolt 68. The bolt 68 in the preferred embodiment, is $4\frac{1}{2}$ inches long and is threaded at its end for 2 inches at 13 threads per inch. The bolt 68 is $\frac{1}{2}$ inch in diameter. The bolt 68 screws into the tapped hole 56 of block 52. It rotates freely in the hole 66 in block 62 connected to the rail 32. There are washers 72 spot welded onto the bolt 68 at either side of block 62 to prevent the bolt 68 from any translational movement with the respect to the block 62. The head 74 of the bolt extends over the edge of the freezing plate so that it may be accessed easily for making adjustments.

The height of the spacer bar 36 is adjusted as follows, referring to FIGS. 7A and 7B. When the contact plate freezer 10 is to be used for a product having a height different from the height of the products presently being frozen, the spacers on all the freezing plates in the stack would be changed to accommodate the new product. The spacer means on a freezing plate 20 is adjusted when the freezing plate 20 is at the top of the lower stack. At this position, there is no freezing plate 20 resting on top of the spacer bars and they can be adjusted without any unnecessary resistance. A wrench or preferably a speed socket is used to turn the head 74 of the bolts 68 at both edges of the freezing plate 20. Assuming that the spacer bar has been in its bottom position as shown in FIG. 7A, the bolt would be rotated clockwise and as it screws into the tapped hole 56 it would pull on the block 52. As it does so, the spacer bar 36 is pulled in the direction of the front edge of the freezing plate. The pulling means 50 thus transfers the rotational movement of the bolt 68 into the translational movement of the spacer bar 36. The wedges 38 act as ramps and the spacer bar 36 slides up the ramps as it is pulled forward by the bolt 58. The spacer bar 36 can be adjusted in the opposite direction by rotating the bolt 68 counterclockwise. The spacer bar 36 slides down the wedges 38 until contact is made with the freezing plate surface.

The spacer bar 36 can be pulled forward and upwards until it butts into a position bar 30. The position bar 30 is mounted securely within each trackway 34. The height of the position bar 30 is the same as that of the spacer bar 36 so that it also supports the overlying freezing plates 20, when the spacer bar 35 is in its bottom position. The edge of the position bar 30 which stops the spacer bar 36 from moving forward is set so that the top position height of all of the spacer bars 36 on all of the freezing plates 20 are the same. In the preferred embodiment, a top position height of 1 9/32 inches is used. The position of bar 30 relieves the user of the need to make careful measurements of the height of the spacer bar 36. The user simply needs to turn the bolt 68 until the position bar 30 is hit. Incidentally, in the presently preferred embodiment, block 52 hits into the rail 32 at the spacer bar's top position and thereby, also contributes to setting the top position accurately.

In the top position, the spacer bar 36 is supported by the wedges 38. The dowels 54 and 64 have rotated within their holes to accommodate the new configuration. At the top height, the separation distance between the freezing plates in the stack has been increased, as seen by comparing FIGS. 8A and 8B. Thus, a different size product may be frozen within the contact space freezer and the usefulness of the freezer has been accordingly increased.

The preferred embodiment allows for two fixed height positions. Obviously, any height may be attained as the spacer bar 36 is pulled up the wedges 38. It should be understood that various changes and modifications to the preferred embodiment will be apparent to those skilled in the art. For example, the position bar 30 could be made replaceable, so that the top position could be changed by changing the length of the position bar 30 used. Another possibility would be to use steps along the top of the wedges to provide for more than two positions. Alternate pulling means known to those skilled in the art could be substituted for the bolt and blocks. Of course, the dimensions may be changed to accommodate an unlimited number of embodiments which may employ the present invention. These and other changes can be made without departing from the spirit and the scope of the invention and without diminishing its attendant advantages. It is therefore intended that such changes and modifications be covered by the following claims.

I claim:

1. In a contact plate freezer, for freezing products brought in contact with a pair of consecutive freezing plates on a stack of freezing plates, said stack including a pair of consecutive freezing plates consisting of a first and a second freezing plate, the improvement comprising:
   spacer means, adjustable to the size of the products, mounted on said first freezing plate for separating said second freezing plate from said first freezing plate, a distance substantially equal to the height of the products, said spacer means comprising:
   ramp means mounted on said first freezing plate;
   a plurality of spacer bars overlying said ramp means, said spacer bars determining the separation distance between said first freezing plate and said second freezing plate; and
   pulling means, each corresponding to one of said spacer bars, for pulling said spacer bars along said ramp means, thereby adjusting the separation distance.

2. The apparatus of claim 1 wherein said ramp means include wedges and said spacer bars include notches corresponding to each of said wedges.

3. The apparatus of claim 1 wherein each of said pulling means includes:
   a block connected to the corresponding spacer bar, having a tapped hole; and
   a bolt, mounted to said first freezing plate, engaged with said tapped hole, so that rotation of said bolt causes translation of the corresponding spacer bar.

4. An improved freezing plate for use in a contact plate freezer comprising:
   a shelf, having a top surface and a bottom surface;
   trackways on the top surface of said shelf along opposite edges of said shelf;
   ramp means, positioned along said trackways;
   a spacer bar on each of said trackways for supporting a freezing plate placed on top of said improved freezing plate; and
   means for pulling said spacer bars over said ramp means so that a freezing plate supported by said spacer bars would be separated from said improved freezing plate a distance dependent upon the position of said spacer bars on said ramp means.

5. The improved plate of claim 4 wherein said ramp means include wedges and said spacer bars include wedge-shaped notches superposed over said wedges.

6. The improved freezing plate of claim 4 wherein said pulling means includes:
   a block, rotatably secured to each of said spacer bars, said block having a tapped hole; and
   a bolt, corresponding to each of said blocks, mounted to said improved freezing plate, said bolt engaged with said tapped hole in said corresponding block so that rotation of said bolts causes translation of said spacer bar secured to said corresponding block.

7. A multiproduct contact plate freezer comprising:
   a stack of freezing plates, including an upper and a lower stack;
   means for supporting the upper stack of freezing plates above the lower stack of plates to separate the two stacks by a height greater than the height of the products to be frozen;
   means for loading products onto the freezing plate on top of the lower stack;
   lifting means, operative with said stack of freezing plates, for removing the freezing plate from the top of the lower stack of freezing plates and lifting it onto the bottom of the upper stack of freezing plates, after the freezing plate has been loaded with products;
   cooling means for maintaining said freezing plates at temperatures cold enough for freezing products which are placed in contact with said plates;
   spacer means, mounted on a first freezing plate in said stack of freezing plates, for adjustably separating said first freezing plate from a consecutive freezing plate a distance substantially equal to the height of the products to be frozen, so that the products make contact with both said first freezing plate and said consecutive freezing plate, said spacer means comprising:
   ramp means mounted on said first freezing plate;
   a plurality of spacer bars overlying said ramp means; and
   means for pulling each of said spacer bars along said ramp means, to determine the distance separating said first freezing plate from said consecutive freezing plate; and wherein said lifting means lowers the upper stack of freezing plates after the lower stack has become void of freezing plates so that the entire stack of freezing plates becomes the lower stack of freezing plates.

8. The multiproduct contact plate freezer of claim 7 wherein said adjustable spacer means includes:

a trackway along each of opposite edges of said first freezing plate;

wedges positioned within said trackways;

spacer bars, positioned in each of said trackways providing support for said consecutive freezing plate, said spacer bars having wedge-shaped notches along their bottom edge which are superposed over said wedges in said trackways; and means for pulling each of said spacer bars along said wedges so that the distance between said first freezing plate and said consecutive freezing plate is dependent on the position of said spacer bars relative to said wedges.

9. The multiproduct contact plate freezer of claim 7 or 8 wherein each of said pulling means includes:

a block, corresponding to each of said spacer bars, rotatably secured to said corresponding spacer bar, said block having a tapped hole; and a bolt, corresponding to each of said blocks, mounted to said freezing plate, said bolt engaged with the tapped hole in said corresponding block so that rotational movement of said bolt causes translational movement of said spacer bar secured to said corresponding block.

10. A multiproduct contact plate freezer comprising:

a stack of freezing plates, divided into upper and lower stacks, each stack of freezing plates including a first freezing plate and a second freezing plate, said second freezing plate consecutively positioned above said first freezing plate on said stack;

each of said freezing plates containing hollow conduits to accommodate the circulation of a refrigerant through said plates so that the temperature of the surface of said freezing plates is cold enough to freeze products which are placed in contact with said plates;

trackways at opposite edges along the top of said first freezing plate;

wedges positioned along said trackways;

a spacer bar in each of said trackways, having wedge-shaped notches along their bottom edges superposed on said wedges, said spacer bars also having a flat top edge for supporting said second freezing plate;

blocks rotatably secured to each of said spacer bars, said blocks having tapped holes;

bolts mounted on said first freezing plate adjacent each of said trackways, said bolts engaging said tapped holes in said blocks so that rotational movement of said bolts cause translational movement of said spacer bars;

hydraulic lifting means for removing a freezing plate from the top of the lower stack of said freezing plates and placing it at the bottom of the upper stack of said freezing plates;

catch arms for supporting the upper stack of freezing plates above the lower stack of plates, said catch arms including springs to allow a freezing plate being lifted by said hydraulic lifting means to push said catch arms aside as the freezing plate is lifted, said springs bringing the catch arms back into position to support the just enlarged upper stack of freezing plates;

a sweeper arm which pushes a row of products onto the freezing plate at the top of the lower stack of freezing plates, such that when said freezing plate is loaded to capacity with products the loading of a row of products causes the unloading of a row of frozen products from the opposite end of said freezer plate; and wherein said hydraulic lifting means lowers the upper stack of freezing plates after the lower stack has become void of freezing plates so that the entire stack of freezing plates becomes the lower stack of freezing plates.

* * * * *